US010027753B2

(12) United States Patent
y Arcas et al.

(10) Patent No.: US 10,027,753 B2
(45) Date of Patent: Jul. 17, 2018

(54) CLOUD SERVICE HOSTING ON CLIENT DEVICE

(71) Applicant: Microsoft Corporation, Redmond, WA (US)

(72) Inventors: Blaise Aguera y Arcas, Seattle, WA (US); Hen Fitoussi, Tel-Aviv (IL); Benny Schlesinger, Ramat Hasharon (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 399 days.

(21) Appl. No.: 14/054,530

(22) Filed: Oct. 15, 2013

(65) Prior Publication Data

US 2015/0106430 A1  Apr. 16, 2015

(51) Int. Cl.
*H04L 29/08* (2006.01)
*G06F 8/61* (2018.01)
(Continued)

(52) U.S. Cl.
CPC ............ *H04L 67/1097* (2013.01); *G06F 8/61* (2013.01); *G06F 8/65* (2013.01); *G06F 9/5072* (2013.01);
(Continued)

(58) Field of Classification Search
CPC ... H04L 67/10; G06F 8/61; G06F 8/65; G06F 9/5072
See application file for complete search history.

(56) References Cited

U.S. PATENT DOCUMENTS 6,366,945 B1 * 4/2002 Fong ..................... G06F 9/5066
                                                           718/104
6,614,804 B1 * 9/2003 McFadden ................ G06F 8/65
                                                           348/E5.006
(Continued)

FOREIGN PATENT DOCUMENTS

EP    1204025 A2 *  5/2002    ........... G06F 9/5033
EP    1204025 A2     8/2002

OTHER PUBLICATIONS

European Patent Office, "International Preliminary Report on Patentability", dated Sep. 18, 2015 in related International Application No. PCT/US2014/059790, Netherlands.
(Continued)

*Primary Examiner* — Uzma Alam
(74) *Attorney, Agent, or Firm* — The Law Office of Michael E. Kondoudis

(57) ABSTRACT

One or more techniques and/or systems are provided for cloud service hosting on a client device. For example, a cloud service may comprise data and/or functionality that may be consumed by apps on client devices. The cloud service may be hosted within a cloud computing environment because a client device may not comprise processing resources capable of hosting the entire cloud service. Accordingly, a local service may be deployed on a client device as a local instantiation of the cloud service. For example, the local service may be a local instantiation of at least a portion of the data and/or functionality of the cloud service. In this way, the local service may utilize fewer resources than the cloud service, and may locally process requests from apps on the client device. For example, a map local service may process requests using map data locally cached from a map cloud service.

21 Claims, 13 Drawing Sheets

(51) Int. Cl.
*G06F 8/65* (2018.01)
*G06F 9/50* (2006.01)

(52) U.S. Cl.
CPC ........ *H04L 67/2857* (2013.01); *H04L 67/303* (2013.01); *H04L 67/306* (2013.01); *Y02D 10/22* (2018.01); *Y02D 10/36* (2018.01)

(56) References Cited

U.S. PATENT DOCUMENTS

| | | | | |
|---|---|---|---|---|
| 6,996,805 | B2 * | 2/2006 | Achlioptas | G06F 11/3688 714/E11.208 |
| 7,213,231 | B1 * | 5/2007 | Bandhole | G06F 8/20 717/101 |
| 7,536,390 | B2 * | 5/2009 | Ebbo | G06F 17/30902 |
| 7,861,243 | B2 * | 12/2010 | Narayanaswamy | G06F 8/61 717/172 |
| 8,255,548 | B2 | 8/2012 | Hopkins et al. | |
| 8,468,455 | B2 * | 6/2013 | Jorgensen | G06F 9/4445 715/733 |
| 8,543,441 | B2 * | 9/2013 | Siegel | G06Q 10/109 455/456.1 |
| 8,589,481 | B2 * | 11/2013 | Das | G06F 15/16 709/203 |
| 8,589,541 | B2 * | 11/2013 | Raleigh | H04L 41/0893 709/224 |
| 8,612,406 | B1 * | 12/2013 | Said | G06F 17/30171 707/704 |
| 8,635,635 | B2 * | 1/2014 | Ray | G06F 21/121 719/330 |
| 8,732,311 | B1 * | 5/2014 | Lam | H04Q 11/0478 709/203 |
| 8,739,282 | B1 * | 5/2014 | Jayarannan | G06F 11/0709 713/187 |
| 8,762,709 | B2 * | 6/2014 | Greer | H04L 63/02 713/155 |
| 8,793,379 | B2 * | 7/2014 | Upadhya | G06F 3/0605 709/226 |
| 8,805,951 | B1 * | 8/2014 | Faibish | G06F 9/5072 709/213 |
| 8,814,692 | B2 * | 8/2014 | Konkle | A63F 13/27 463/42 |
| 8,904,503 | B2 * | 12/2014 | Agbabian | G06F 21/6245 380/277 |
| 8,930,917 | B2 * | 1/2015 | Mittal | G06F 11/366 717/124 |
| 9,027,016 | B1 * | 5/2015 | Alford | G06F 8/61 717/121 |
| 9,146,603 | B2 * | 9/2015 | Reber | G06F 1/3203 |
| 9,147,286 | B2 * | 9/2015 | Piemonte | G01C 21/3638 |
| 9,152,541 | B1 * | 10/2015 | Kuo | G06F 11/3672 |
| 9,239,668 | B2 * | 1/2016 | Zhang | H04L 67/22 |
| 9,298,407 | B2 * | 3/2016 | Chang | G06F 3/1204 |
| 9,395,965 | B2 * | 7/2016 | Garimella | G06F 8/10 |
| 9,529,635 | B2 * | 12/2016 | Werth | G06F 9/4446 |
| 2006/0206452 | A1 * | 9/2006 | Ebbo | G06F 17/30902 |
| 2009/0313319 | A1 * | 12/2009 | Beisiegel | H04L 67/42 709/203 |
| 2013/0054734 | A1 | 2/2013 | Bond et al. | |
| 2013/0074046 | A1 * | 3/2013 | Sharma | G06F 11/3688 717/126 |

OTHER PUBLICATIONS

Shi, et al., "Computing in Cirrus Clouds: The Challenge of Intermittent Connectivity", In Proceedings of the First Edition of the MCC Workshop on Mobile Cloud Computing, Aug. 17, 2012, 6 pages, http://conferences.sigcomm.org/sigcomm/2012/paper/mcc/p23.pdf.

Giurgiu, et al., "Calling the Cloud: Enabling Mobile Phones as Interfaces to Cloud Applications", In Proceeding the ACM/IFIP/USENIX 10th International Conference on Middleware, Nov. 30, 2009, 20 pages, http://www.ics.uci.edu/~cs230/reading/riva_middleware09.pdf.

"Local Cloud—Sync Local Files with Online Storage", Published on: Nov. 21, 2011, pp. 3, Available at: http://www.egnyte.com/online-storage/local-cloud-features.html.

"The IBM Vision of a Smarter Home Enabled by Cloud Technology", Retrieved on: Aug. 6, 2013, pp. 16, Available at: http://public.dhe.ibm.com/common/ssi/ecm/en/lbw03001usen/LBW03001USEN.PDF.

"All About iCloud", Published on: Jan. 8, 2012, pp. 5, Available at: http://www.gcfleamfree.org/icloud/1.

Bradley, Tony, "Box App Keeps You Connected to Cloud Data Offline", Published on: Aug. 11, 2010, pp. 2, Available at: http://www.pcworld.com/article/203047/box_app_keeps_you_connected_to_cloud_data_offline.html.

United States Patent and Trademark Office, "Second Written Opinion Issued in PCT Application No. PCT/US2014/059790", Jun. 24, 2015, USA.

Int. Search Report cited in PCT Application No. PCT/US2014/059790 dated Dec. 19, 2014, 11 pgs.

\* cited by examiner

CLOUD SERVICE HOSTING ON CLIENT DEVICE

BACKGROUND

Devices, such as mobile devices, may rely upon cloud services hosted by cloud computing environments. In an example, apps on a device may access various cloud services through a network for data and/or functionality processing. For example, a restaurant app on a mobile device may access a map cloud service for restaurant business listing data and access a reservation cloud service for restaurant reservation functionality. Because a cloud service may be hosted within a cloud computing environment on a cloud hosting device (e.g., a cloud server infrastructure) that is different than a local device hosting an app consuming data and/or functionality of the cloud service, various connectivity, latency, privacy, scalability, underutilization of local processing resources, and/or other issues may arise.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for cloud service hosting on a client device are provided herein. For example, a cloud service may be hosted within a cloud computing environment (e.g., a music cloud service). The cloud service may comprise extensive data (e.g., a song database for various genres of music) and/or code modules (e.g., a song recognition module, a song purchasing module, a song user review module, a song download module, a song playback module, etc.). Accordingly, a local service may be deployed on a client device for instantiation of the cloud service, such that the local service may locally process requests from apps on the client device to the cloud service. The local service may comprise at least some of the data and/or functionality of the cloud service for processing such requests. For example, a music local service may locally cache songs from the song database of the music cloud service that correspond to a music genre that is of interest to a user of the client device. Song recognition functionality from the song recognition module of the music cloud service may be installed into the music local service. In this way, the music local service may locally process requests for song recognition functionality from apps on the client device. In an example, the music cloud service may remain available for processing requests that the music local service may be unable to process (e.g., a song playback request). In another example, the music cloud service may remain available to provide additional data to the music local service (e.g., songs corresponding to a genre not yet locally cached on the client device) and/or functionality (e.g., the user may desire to purchase a song, and thus a song purchasing module may be used to update the music local service). Data and/or functionality that may be relevant to the user may be predicted and/or obtained from the cloud music service for utilization by the local music service in a seamless and/or automated manner.

In an example of cloud service hosting on a client device, a functionality retrieval component may be configured to receive a functionality code package from a cloud service (e.g., an image cloud service). The functionality code package may comprise an instance of functionality provided by a code module of the cloud service (e.g., image recognition functionality). The functionality code package may be installed into a local service on the client device (e.g., or used to deploy of a new local service on the client device) for execution of the functionality by the local service as a local instantiation of the code module of the cloud service. For example, an image local service may utilize the image recognition functionality to process requests by apps on the client device, such as a request from a camera app.

In an example, a data fetch component may be configured to retrieve a data package from the cloud service (e.g., tree image data, used by image recognition functionality to recognize trees, may be retrieved based upon a user of the client device having an interest in trees and/or the client device comprising user images of trees). In an example, various device signals (e.g., a current GPS location, such as in a national forest) and/or local data (e.g., a forest picture library, emails regarding a tree topic, a search history for trees, etc.) may be leveraged to determine what subsets of data may be fetched from the cloud service. For example, the local service may be connected to such device signals and/or local data, which may be utilized for maintaining a local cache of data from the cloud service. The data package may comprise a subset of data utilized by the cloud service (e.g., trees images, but not other images such as car images used to recognize cars, due to storage constraints of the client device). The data package may be stored within a local cache on the client device for utilization by the local service.

In an example, a runtime execution component may be configured to receive (e.g., intercept) a request from an app hosted on the client device to access functionality of the cloud service (e.g., the camera app may send a request, such as an HTTP request, for the cloud service to perform image recognition functionality). The runtime execution component may be configured to identify a local service, such as the image local service, as being configured to process the request. The local service may be hosted on the client device as a local instantiation of the cloud service (e.g., a background service configured to locally process requests for the cloud service on behalf of the cloud service). In this way, the local service may be invoked to process the request utilizing an instance of the functionality (e.g., the image recognition functionality and/or the tree image data).

Locally hosting an instantiation of a cloud service on a client device as a local service, among other things, mitigates privacy issues that may otherwise occur by transmitting sensitive user information to a cloud service (e.g., the user information may be locally processed by the local service to improve security by keeping the user information on the client device). Scalability issues with the cloud service environment may be mitigated by utilizing processing power of the client device to locally process requests on behalf of the cloud service (e.g., automatic scaling may be supported for a growing number of users because client devices of such users may be utilized for processing requests, as opposed to increasing the load at the cloud service environment which may lead to adding costly new cloud processing equipment). Leveraging local processing power of client devices may decrease costs associated with maintaining the cloud service environment because relatively fewer servers or other machines may be needed and/or may need to be maintained. Because the local service may be available on the client device regardless of whether the client device has connectivity (e.g., a lack of internet connectivity, a lack of connectivity to the cloud service; etc.), offline support for processing requests may be locally facilitated (e.g., a user may be capable of reading news locally cached on a client device from a cloud news reading service even though the client device does not presently have connectivity to the cloud news reading service, such as during travel or in a subway). A local instantiation of a cloud service on a client device may perform equally or better than the cloud service. For example, because the service running locally on the device can use local user data that might not be available to the cloud service (e.g., GPS location, call log, etc.) the user may be provided with a more robust experience (e.g., more relevant, localized, etc. search results) than if the cloud service was implemented.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
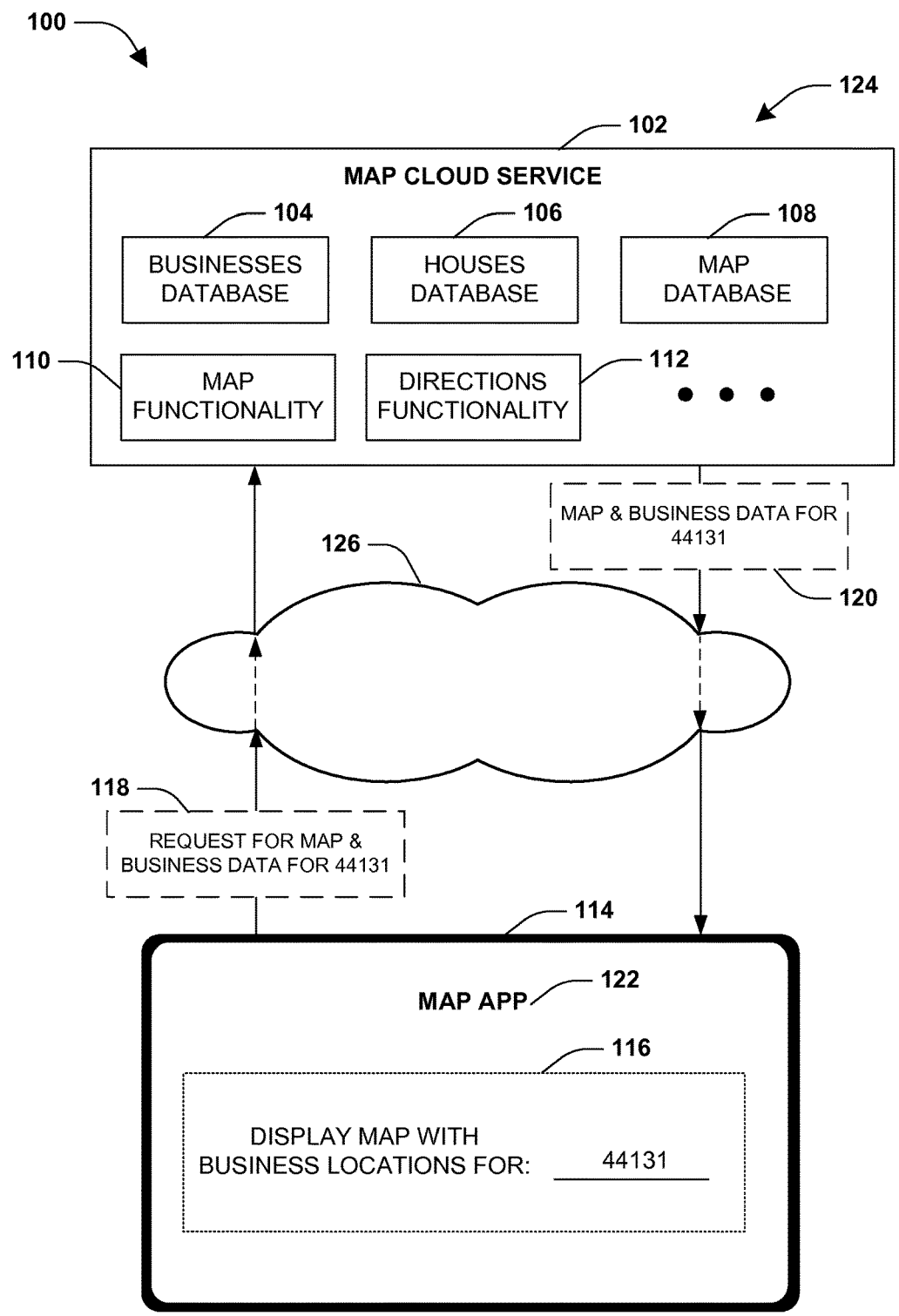
FIG. 1 is an illustration of an example of a conventional technique for processing a request from an app on a client device utilizing a cloud service hosted on a cloud computing environment.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

FIG. 1 illustrates an example 100 of a conventional technique for processing a request from an app on a client device 114 utilizing a cloud service hosted on a cloud computing environment 124. The client device 114 may comprise a map app 122 configured to display a map populated with business locations for a particular zip code. For example, a user may issue a command 116 for the map app 122 to display business locations for a zip code 44131. The map app 122 may be configured to process the command 116 by issuing a request 118 through a network 126 to a map cloud service 102 hosted on the cloud computing environment 124 (e.g., a cloud server infrastructure different than the client device 114). That is, the map app 122 may lack data and/or functionality used to perform the command 116, and thus the map app 122 is reliant upon various functionality (e.g., map functionality 110, directions functionality 112) and/or data (e.g., data from a businesses database 104, data from a houses database 106, and/or data from a map database 108, etc.) provided by the map cloud service 102 through the network 126 to the map app 122, such as data 120. Such data and functionality may be hosted by the map cloud service 102 but not the map app 122 because the client device 114, such as a mobile device, may lack appropriate computing resources (e.g., the map database 108 may comprise a very large amount of map information for the world that may not fit within storage of the client device 114). Such a conventional client/server configuration (e.g., the map app 122 as the client and the map cloud service 102 as a server) may result in underutilized device processing power of the client device 114, connectivity issues (e.g., the map cloud service 102 may be inaccessible to the client device 114 due to connectivity issues with the network 126 and/or the cloud computing environment 124), privacy issues due to user data being sent to the cloud computing environment 124, latency issues with the network 126, etc.

Figure 2:
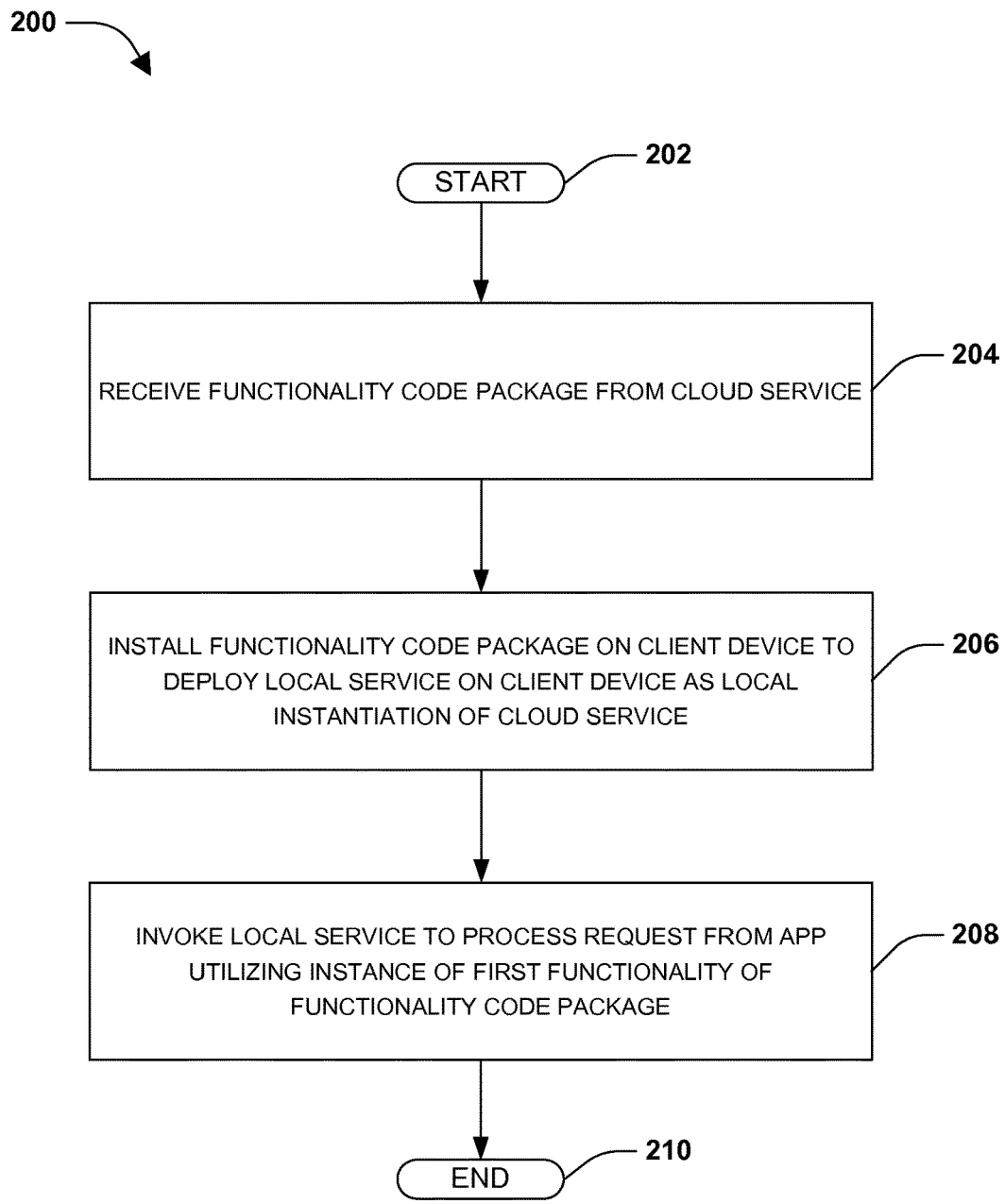
FIG. 2 is a flow diagram illustrating an exemplary method of deploying a local service on a client device as a local instantiation of a cloud service.

An embodiment of deploying a local service on a client device as a local instantiation of a cloud service is illustrated by an exemplary method 200 of FIG. 2. At 202, the method starts. In an example, a client device may comprise one or more apps that may consume data and/or functionality provided by cloud services. For example, a realtor app may consume house pricing data, house map display functionality, house listing functionality, house bidding functionality, and/or other functionality provided by a house mapping cloud service. Accordingly, a local service may be deployed on the client device as a local instantiation of the cloud service, such that the local service may locally process requests from apps to the cloud service (e.g., a local house mapping service may be deployed as a local instantiation of the house mapping cloud service on the client device, and may comprise at least some data and/or functionality of the house mapping cloud service to process requests by the realtor app and/or other apps). In this way, local processing power of the client device may be utilized and/or connectivity issues between the client device and the cloud service may not affect processing of requests because the local service may be hosted on the client device.

In an example of deploying the local service, a functionality code package may be received from the cloud service hosted by a cloud computing environment, at 204. The functionality code package may comprise first functionality provided by a code module of the cloud service (e.g. the functionality code package may comprise at least some house map display functionality provided by a house map display code module of the house mapping cloud service). At 206, the functionality code package may be installed on the client device to deploy a local service, such as the local house mapping service, on the client device as a local instantiation of the cloud service. In an example, a data package may be received from the cloud service (e.g., a portion of the house pricing data corresponding to a location that may be of interest to a user, such as a current location of the user or a location identified from an email, a calendar entry, a task entry, a social network profile, a web search session, etc.). The data package may be stored within a local cache on the client device for utilization by the local service. In an example, the functionality code package and/or the data package may be identified based upon a context associated with an operating context of the client device (e.g., an amount of available storage, processing power, a current power source such as battery or AC, etc.) and/or personalization information of the user (e.g., an interest in moving to Cleveland). In an example, the local service may be updated based upon an update to the cloud service (e.g., the local service may be updated by a functionality update and/or a data update). The update may be obtained from the cloud service, and may be used to update the local service (e.g., the update may be obtained when the client device is connected to WiFi as opposed to cellular data and/or when the client device is connected to AC as opposed to running on battery). In this way, the local service may be deployed and/or maintained on the client device (e.g., as a background service executing on the client device).

At 208, the local service may be invoked to process a request from an app, hosted on the client device, utilizing an instance of first functionality of the functionality code package. For example, the realtor app may send a request (e.g., an HTTP request) for the house mapping cloud service to provide Cleveland housing data to the realtor app. Instead of invoking the house mapping cloud service to process the entire request, the house mapping local service may be invoked to locally process at least some of the request. In an example where the local service is unable to process the entire request, additional data and/or functionality may be retrieved from the cloud service. In another example where the local service is unable to process the entire request, the cloud service may be invoked to process at least a portion of the request. In this way, the local service may be utilized to locally process requests from apps. At 210, the method ends.

Figure 3:
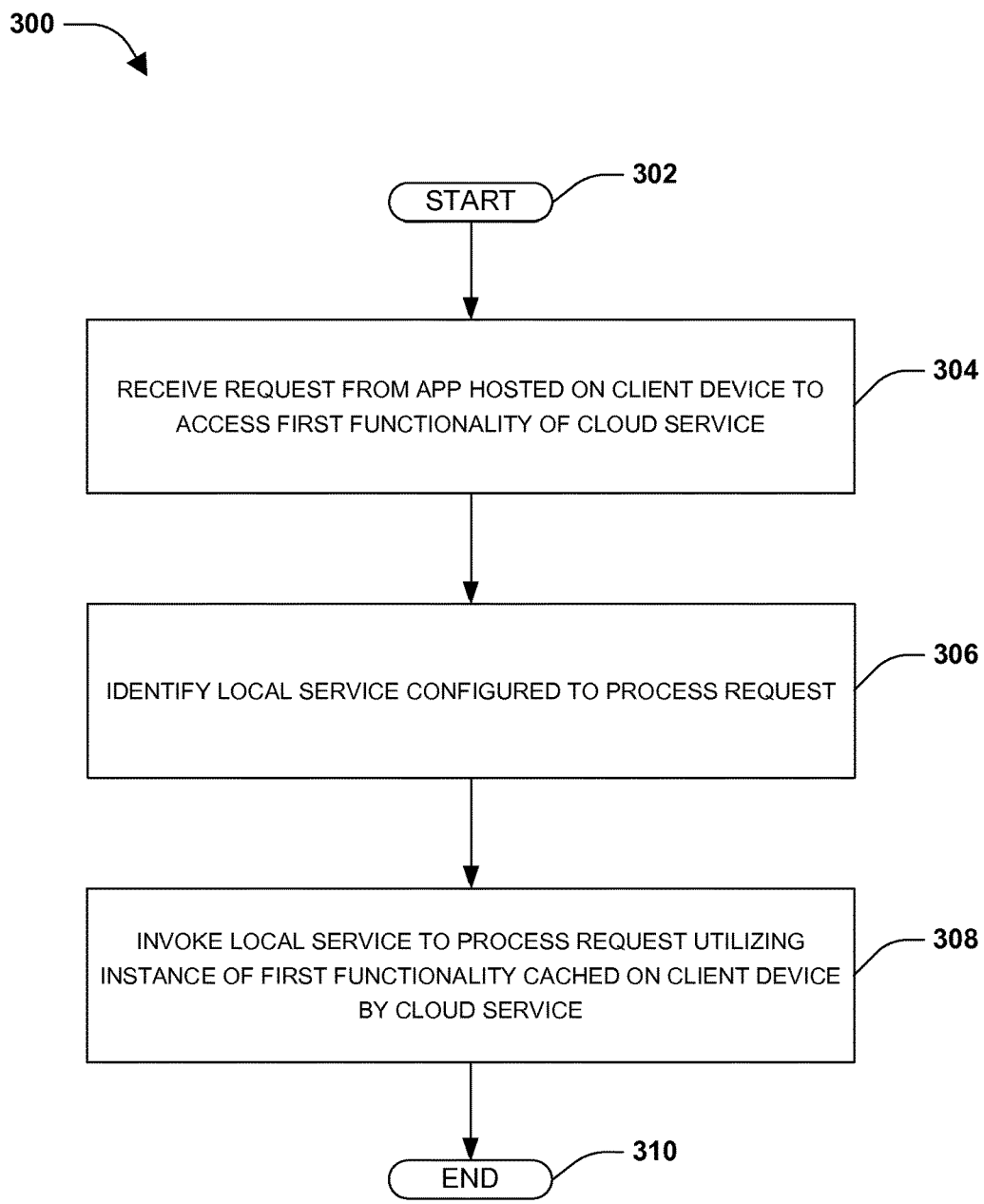
FIG. 3 is a flow diagram illustrating an exemplary method of cloud service hosting on a client device.

An embodiment of cloud service hosting on a client device is illustrated by an exemplary method 300 of FIG. 3. At 302, the method starts. In an example, a local service may have been deployed on a client device as a local instantiation of a cloud service (e.g., a local instantiation of at least a portion of the cloud service), and may be configured to process requests from apps for the cloud service to provide functionality and/or data to such apps. Accordingly, a request may be received (e.g., intercepted) from an app hosted on the client device to access first functionality of the cloud service hosted by a cloud computing environment, at 304. For example, a shopping app may request videogame data and videogame purchasing functionality from a shopping cloud service. At 306, a local service, such as a shopping local service, may be identified as being configured to process such a request. For example, the shopping local service may be hosted as a local instantiation of the shopping cloud service, and may comprise at least some shopping data and/or functionality of the shopping cloud service, such as videogame purchasing functionality and videogame data locally cached to the client device (e.g., a videogame data package and/or a videogame purchasing functionality code package may have been retrieved from the shopping cloud service and locally cached on the client device based upon a user having an interest in videogames). At 308, the local service may be invoked to process the request utilizing an instance of the first functionality cached on the client device by the cloud service. In this way, at least a portion of the request may be locally processed by the shopping local service. At 310, the method ends.

Figure 4A:
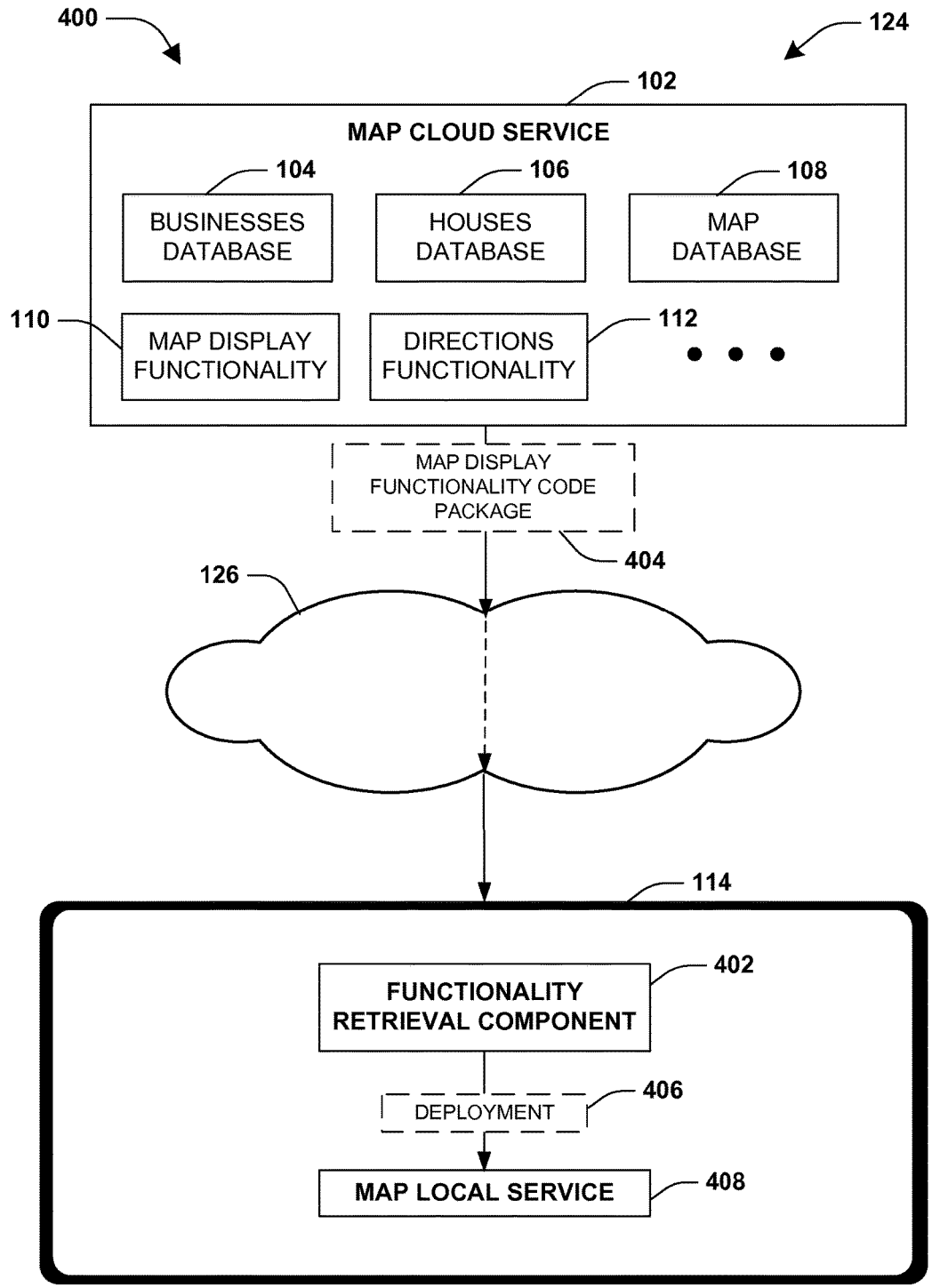
FIG. 4A is a component block diagram illustrating an exemplary system for deploying a local service on a client device.

FIG. 4A illustrates an example of a system 400 for deploying a local service on a client device 114. In an example, a map cloud service 102 may be hosted within a cloud computing environment 124 accessible to apps on various devices through a network 126. The map cloud service 102 may comprise data (e.g., a businesses database 104, a houses database 106, a map database 108, and/or other databases) and/or functionality (e.g., map display functionality 110, directions functionality 112, and/or other functionality) that may be used to process requests from such apps. Because the data and/or functionality may be too large and/or computationally intensive to maintain on client devices, the map cloud service 102 is hosted within the cloud computing environment 124. However, local processing power of client devices may become underutilized and/or connectivity issues may interrupt access to the map cloud service 102. Accordingly, a functionality retrieval component 402 of the system 400 may be configured to deploy 406 a map local service 408 on the client device 114 as a local instantiation of the map cloud service 102 so that the map local service 408 may locally process requests to the map cloud service 102. For example, the functionality retrieval component 402 may receive a map display functionality code package 404 from the map cloud service 102. The map display functionality code package 404 may comprise at least some of the map display functionality 110 provided by a map display code module of the map cloud service 102 (e.g., a portion of the map display functionality 110 that may be relevant to a user such as running trail map display functionality identified based upon a user interest in running). The functionality retrieval component 402 may install the map display functionality code package 404 into the map local service 408 to deploy 406 the map local service 408 on the client device 114. In this way, the map local service 408 may locally process requests from apps on the client device 114 utilizing the map display functionality code package 404.

Figure 4B:
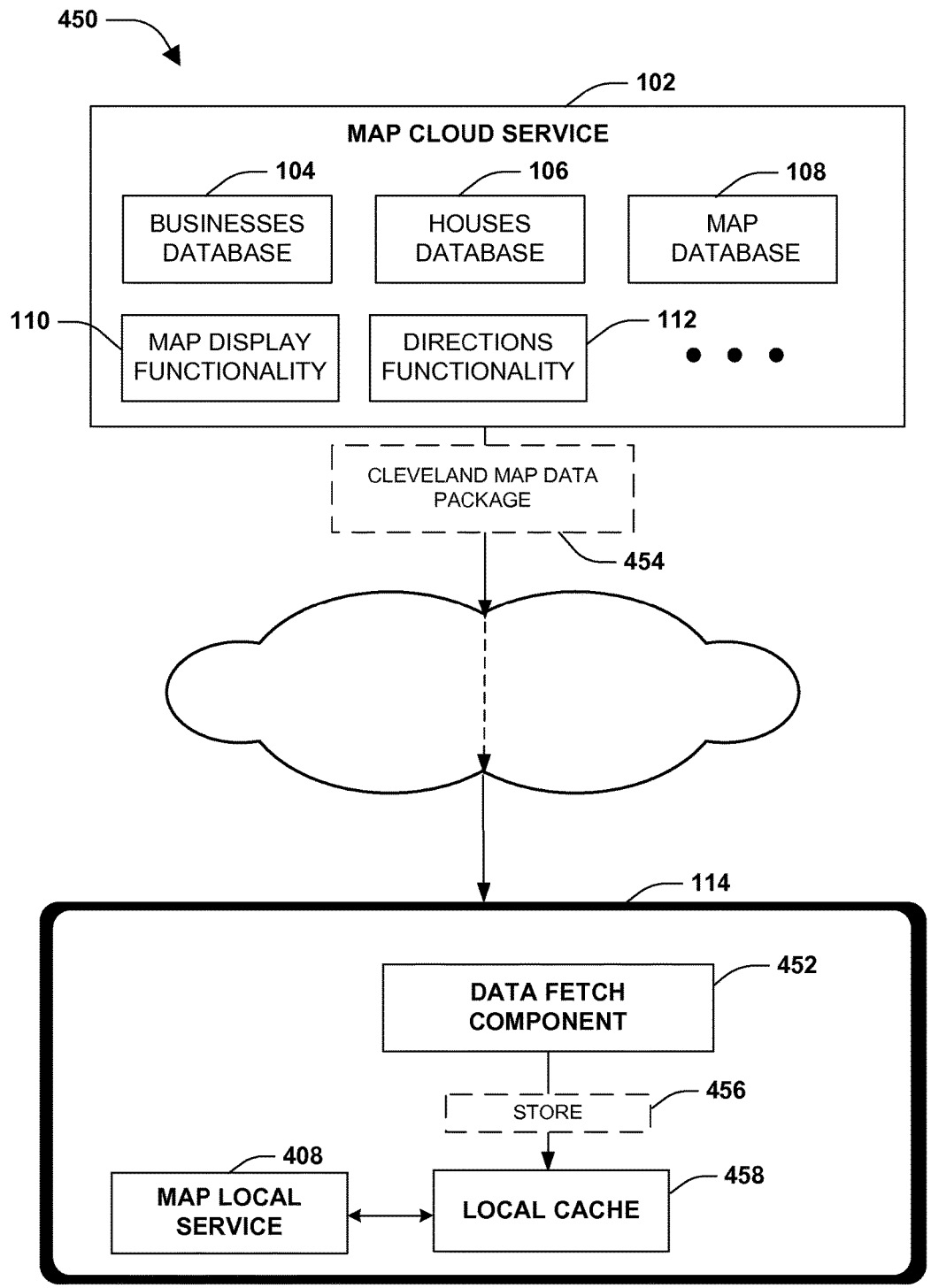
FIG. 4B is a component block diagram illustrating an exemplary system for locally caching data from a cloud service on a client device for utilization by a local service on the client device.

FIG. 4B illustrates an example of a system 450 for locally caching data from a cloud service on a client device 114 for utilization by a local service on the client device 114. In an example, a map local service 408 may have been deployed on the client device 114 (e.g., FIG. 4A). The system 450 may comprise a data fetch component 452. The data fetch component 452 may be configured to receive a data package, such as a Cleveland map data package 454, from the map cloud service 102. In an example, the data fetch component 452 may identify the Cleveland map data package 454 for retrieval based upon a context associated with an operating context of the client device 114 (e.g., the client device 114 may be connected to WiFi as opposed to cellular data, the client device 114 may be in a charging state as opposed to a battery consumption state, a current location of the client device 114 may be Cleveland, etc.) and/or personalization information for a user of the client device 114 (e.g., social network data of the user, such as a microblog message, may indicate that the user may have a running date along trails in Cleveland today). In an example, the Cleveland map data package 454 may comprise a subset of data utilized by the map cloud service 102 (e.g., merely a portion of the map database 108 corresponding to Cleveland and trails due to the map database 108 comprising more information than the client device 114 can store). The data fetch component 452 may store 456 the Cleveland map data package 454 within a local cache 458. The local cache 458 may be available to the map local service 408 for locally processing requests from apps on behalf of the map cloud service 102.

Figure 5:
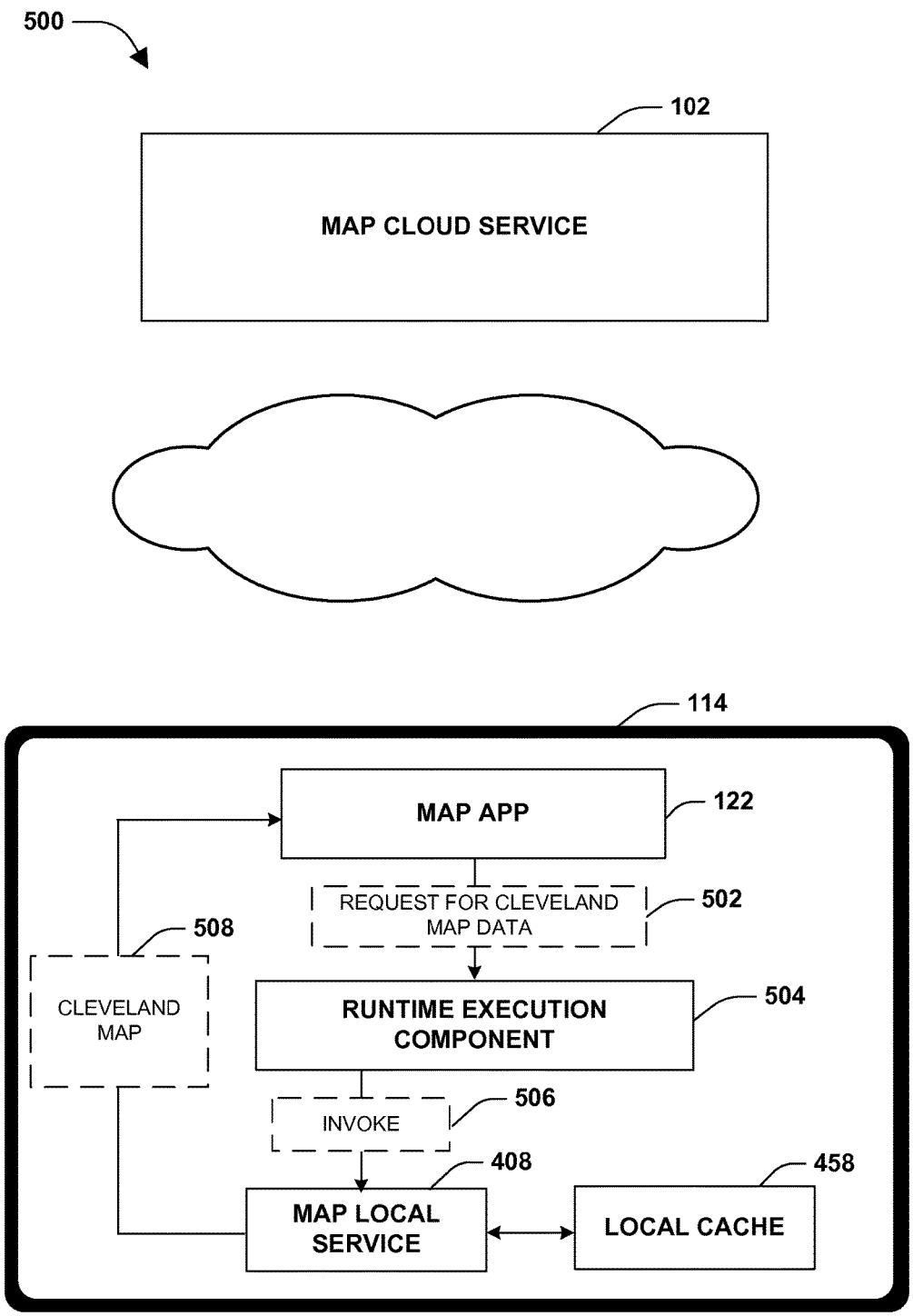
FIG. 5 is a component block diagram illustrating an exemplary system for cloud service hosting on a client device.

FIG. 5 illustrates an example of a system 500 for cloud service hosting on a client device 114. In an example, a map local service 408 may have been deployed on the client device 114 as a local instantiation of a map cloud service 102 (e.g., FIG. 4A). For example, the map local service 408 may comprise map display functionality from a map display functionality code package (e.g., 404 in FIG. 4A) (e.g., running trail map display functionality) provided by the map cloud service 102. The map local service 408 may have access to a local cache 458 comprising data, such as a Cleveland map data package, received from the map cloud service (e.g., 102 in FIG. 4B). In an example, the map local service 408 may execute as a background service configured to process requests from one or more apps hosted on the client device 114.

A runtime execution component 504 of the system 500 may be configured to receive (e.g., intercept) a request from an app hosted on the client device 114 to access first functionality of the map cloud service 102 hosted within a cloud computing environment. For example, the runtime execution component 504 may receive a request 502 (e.g., intercepted an internet protocol request, such as an HTTP request or any other protocol utilized by apps to access the map cloud service 102) from a map app 122 for Cleveland map data in order to display running trails in Cleveland. The runtime execution component 504 may be configured identify the map local service 408 as being configured to process the request (e.g., the map local service 408 may be configured with the running trail map display functionality and/or may have access to the Cleveland map data package within the local cache 458). In an example, the runtime execution component 504 may be configured to facilitate testing of services (e.g., beta testing) by selecting a test service as the local service based upon a test setting (e.g., the test setting may indicate that a percentage of requests are to be processed by a test version as opposed to a non-test version of the local service). In an example, a security check may be performed on the request 502 to determine whether the map app 122 has access credentials to the map cloud service 102 and/or the map local service 408.

The runtime execution component 504 may invoke 506 the map local service 408 to process the request 502 utilizing the instance of the first functionality cached on the client device 114 by the map cloud service 102, such as the running trail map display functionality and/or the Cleveland map data package within the local cache 458. In this way, the map local service 408 may locally process at least a portion of the request 502, and provide a result, such as a Cleveland map 508 populated with running trails, to the map app 122. In an example, the map local service 408 may be provided with access to data and/or functionality hosted by the map cloud service 102, such as when the request 502 corresponds to a portion of data and/or functionality not locally cached on the client device 114. In an example, the runtime execution component 504 may be configured to collect analytics associated with the map local service 408 processing the request 502 (e.g., service usage and/or statistics may be collected because requests from apps on the client device 114 may be routed through a single source, the runtime execution component 504).

In an example, a second cloud service, not illustrated, may be identified as being configured to provide functionality corresponding to a context associated with an operating context of the client device 114 and/or personalization information of the user. For example, the user may have an interest in music based upon social network information, a user profile, email data, calendar data, microblog messages, user photos, etc. The runtime execution component 504 may be configured to install a second local service (e.g., a music local service), not illustrated, on the client device 114 based upon an install package received from the second cloud service (e.g., a music cloud service). The second local service may be hosted on the client device 114 as a local instantiation of the second cloud service. In this way, various local services may be installed on the client device 114 as local instantiations of cloud services based upon (e.g., predicted from) contextual information of the client device 114 and/or information regarding the user. In this way, local services may be seamlessly installed on the client device 114 by a background task (e.g., the runtime execution component 504 may be implemented as a background service configured to perform various background tasks) without requiring user intervention. In some embodiments, however, such installation(s) may not occur until a user accepts or agrees to the same.

Figure 6A:
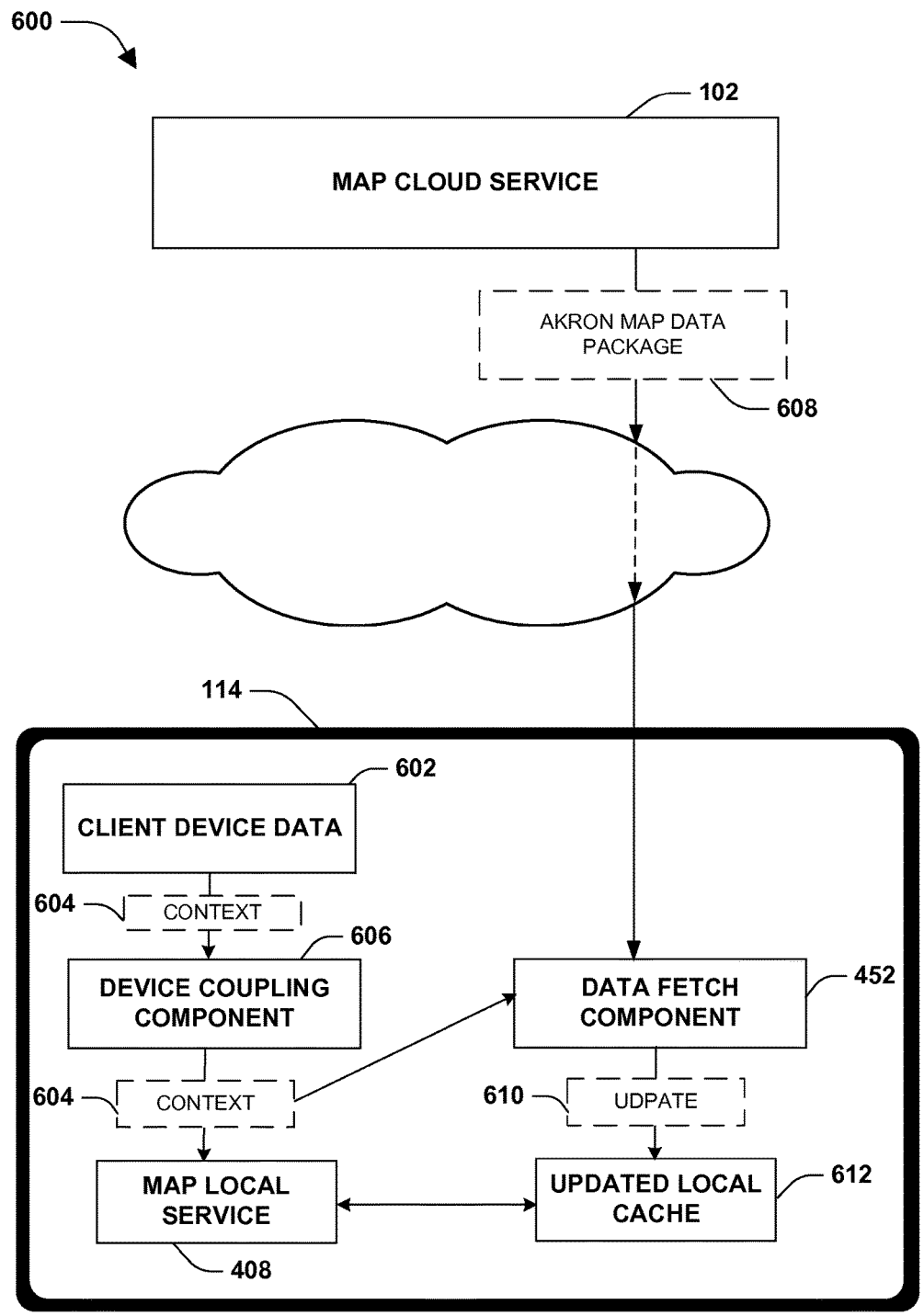
FIG. 6A is a component block diagram illustrating an exemplary system for updating a local service on a client device.

FIG. 6A illustrates an example of a system 600 for updating a local service on a client device 114. In an example, a map local service may have been deployed on the client device 114 as a local instantiation of a map cloud service 102 (e.g., FIG. 4A). A Cleveland map data package may have been locally cached within a local cache for utilization by the map local service 408 (e.g., FIG. 4B). The system 600 may comprise a device coupling component 606 configured to register the map local service 408 with access to client device data 602. The client device data 602 may comprise internet connectivity data (e.g., WiFi access information, cellular data access information, etc.), power source data (e.g., battery power source information, AC power source information, etc.), location tracking (e.g., a current GPS location of the client device 114), user data (e.g., a social network profile, email information, calendar information, task information, and/or other user data that the user may have opted-in to share with the map local service 408), or operating system data. In this way, a context 604 may be identified from the client device data 602. For example, the context 604 may indicate a current location of the client device 114 as being in Akron and that the user has an interest in trail running in Akron today.

A data fetch component 452 may be configured to identify a data package available from the map cloud service 102 based upon the context 604. For example, the data fetch component 452 may retrieve an Akron map data package 608 based upon the context 604 indicating that Akron map data for running trails may be requested by an app on the client device 114. The data fetch component 452 may update 610 the local cache using the Akron map data package 608, resulting in an updated local cache 612 accessible to the map local service 408.

Figure 6B:
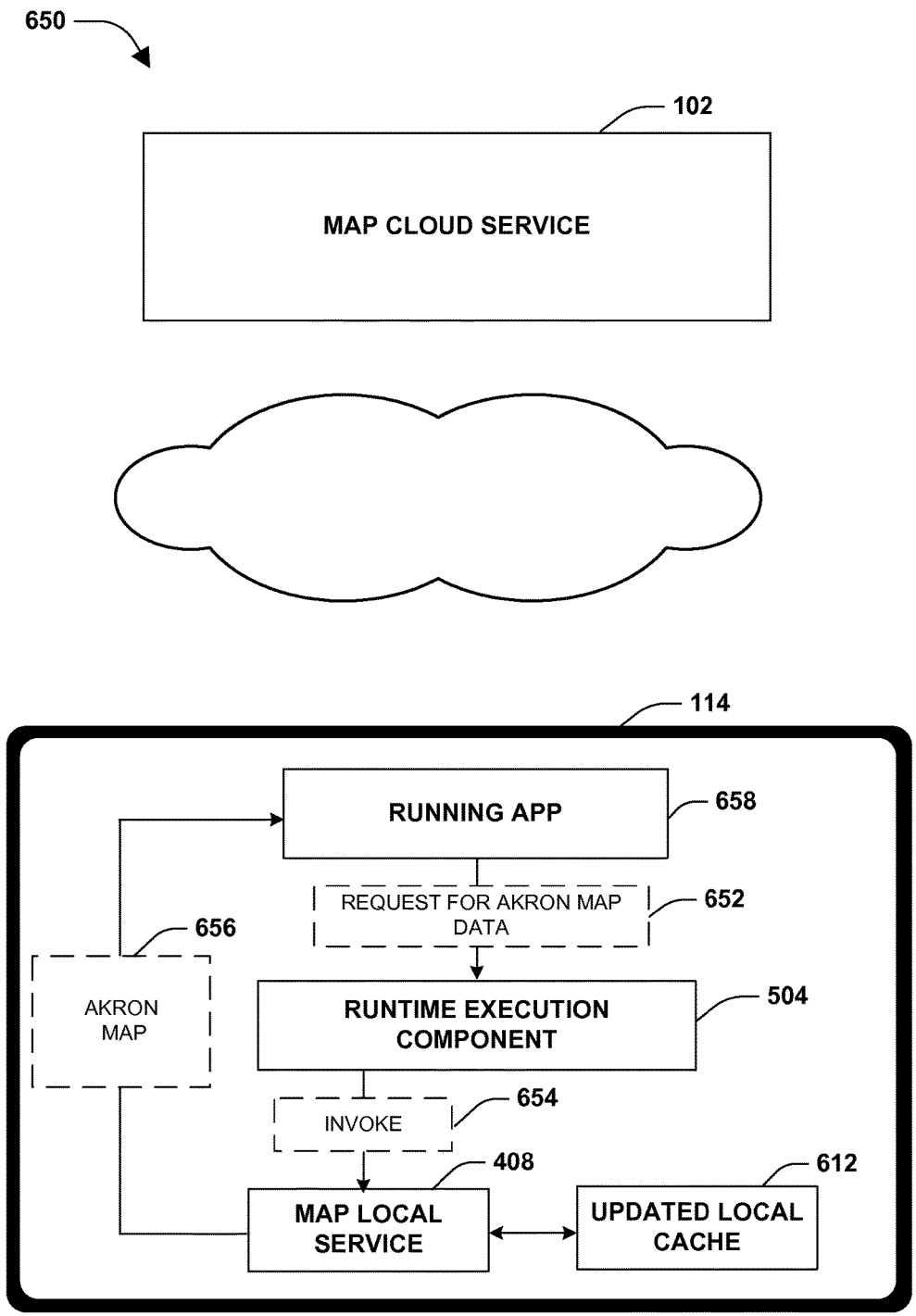
FIG. 6B is a component block diagram illustrating an exemplary system for cloud service hosting on a client device.

FIG. 6B illustrates an example of a system 650 for cloud service hosting on a client device 114. In an example, a map local service 408 may have been deployed on the client device 114 as a local instantiation of a map cloud service 102 (e.g., FIG. 4A). A Cleveland map data package (e.g., 454 in FIG. 4B) and an Akron map data package (e.g., 608 in FIG. 6A) may have been locally cached within an updated local cache 612 for utilization by the map local service 408. The system 650 may comprise a runtime execution component 504. The runtime execution component 504 may be configured to receive (e.g., intercept) a request 652 from a running app 658, hosted by the client 114, to access trail mapping functionality of a map cloud service 102. The runtime execution component 504 may identify the map local service 408 configured to process the request 652. The runtime execution component 504 may invoke 654 the map local service 408 to process the request 652 utilizing trail mapping functionality provided by a map display functionality code package (e.g., 404 in FIG. 4A) installed within the map local service 408. The map local service 408 may utilize the Akron map data package (e.g., 608 in FIG. 6A) locally cached within the updated local cache 612. In this way, the map local service 408 may process the request 652, and may provide an Akron map 656 of running trails to the running app 658.

Figure 7:
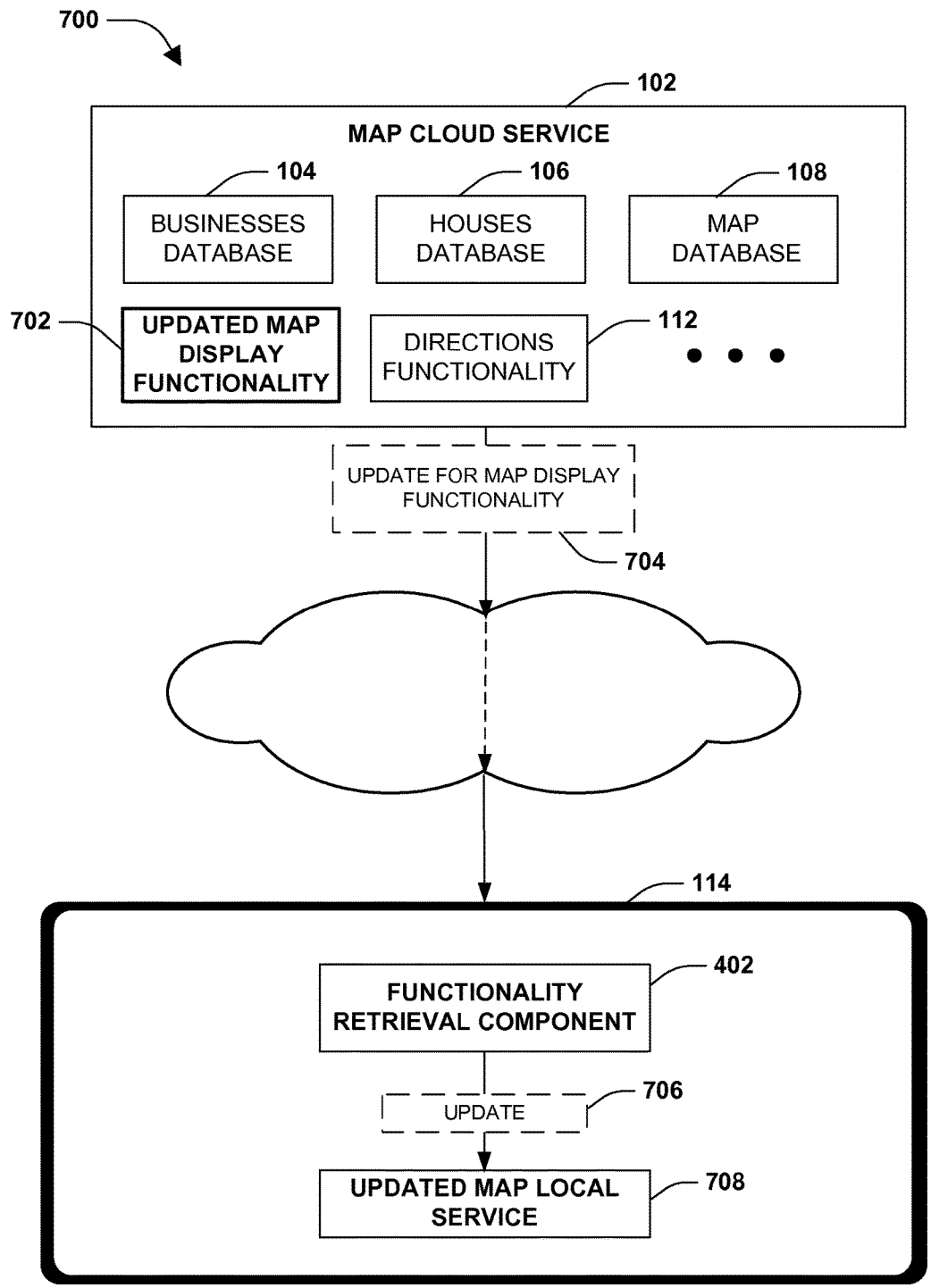
FIG. 7 is a component block diagram illustrating an exemplary system for updating a local service on a client device.

FIG. 7 illustrates an example of a system 700 for updating a local service. In an example, a map local service (e.g., 408 in FIG. 4A) may have been deployed, with a map display functionality code package on the client device 114, as a local instantiation of a map cloud service 102. The system 700 may comprise a functionality retrieval component 402 that may identify an update to functionality provided by the map cloud service 102, such as updated map display functionality 702. The functionality retrieval component 402 may be configured to receive an update 704 for the map display functionality from the map cloud service 102. The functionality retrieval component 402 may apply 706 the update to the map local service, resulting in an updated map local service 708. In this way, the map local service 408 may be automatically and/or seamless updated without requiring user intervention. In some embodiments, however, such update(s) may not occur until a user accepts or agrees to the same.

Figure 8A:
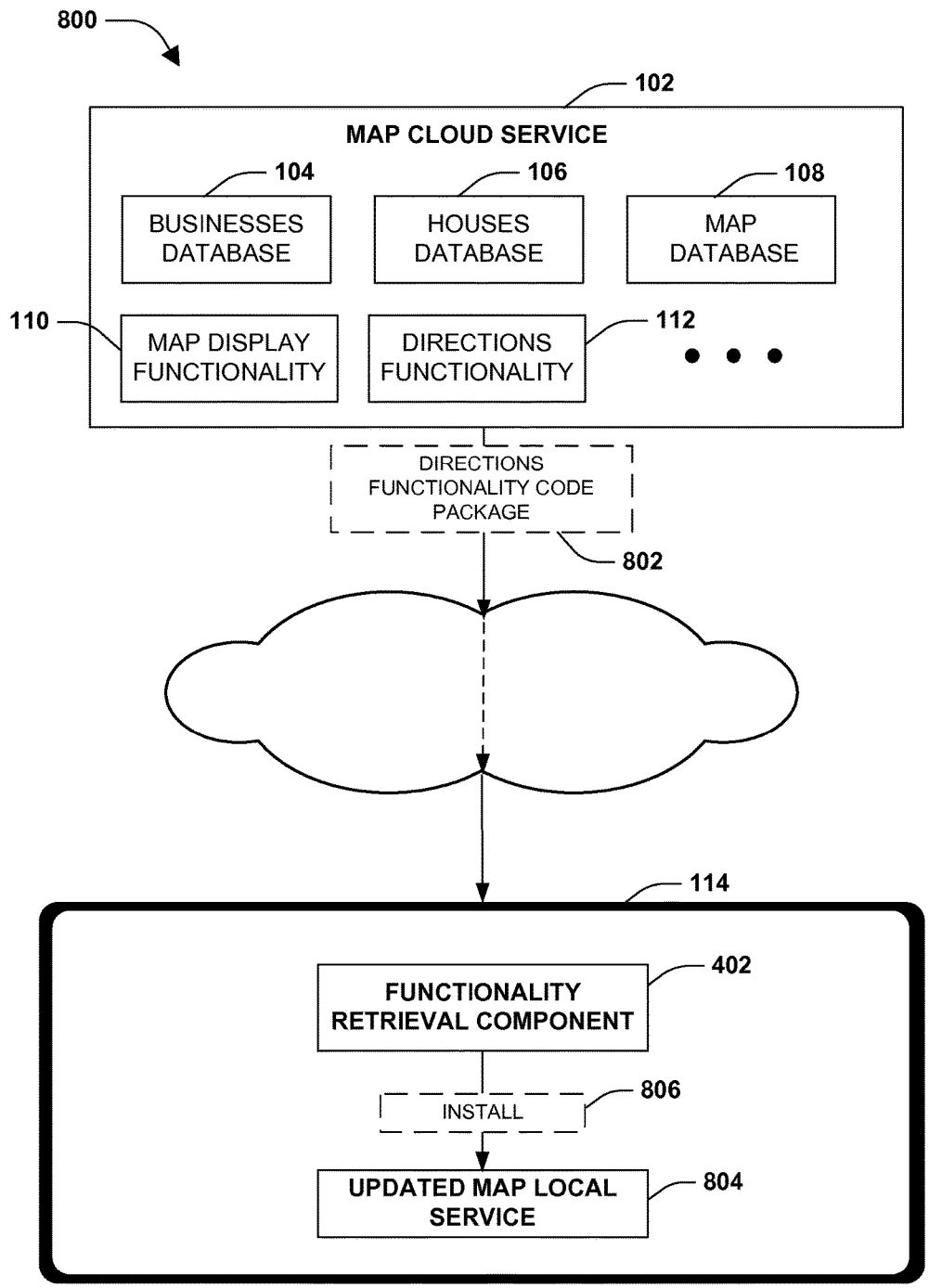
FIG. 8A is a component block diagram illustrating an exemplary system for installing a functionally code package to update a local service.

FIG. 8A illustrates an example of system 800 for installing a functionally code package to update a local service. In an example, a map local service (e.g., 408 in FIG. 4A) may have been deployed, with a map display functionality code package, on a client device 114 as a local instantiation of a map cloud service 102. The system 800 may comprise a functionality retrieval component 402 that may be configured to predict whether a local service may utilize functionality provided by a cloud service. For example, the functionality retrieval component 402 may determine that the map local service does not comprise directions functionality 112 provided by a direction code module of the map cloud service 102. The functionality retrieval component 402 may determine that an app on the client device 114 may request driving directions (e.g., a user calendar entry may indicate an upcoming driving vacation). Accordingly, the functionality retrieval component 402 may retrieve a directions functionality code package 802 comprising at least some of the directions functionality 112 of the map cloud service 102. The functionality retrieval component 402 may install 806 the directions functionality code package 802 into the map local service 408, resulting in an updated map local service 804. In this way, the updated map local service 804 may provide directions to apps on the client device 114.

Figure 8B:
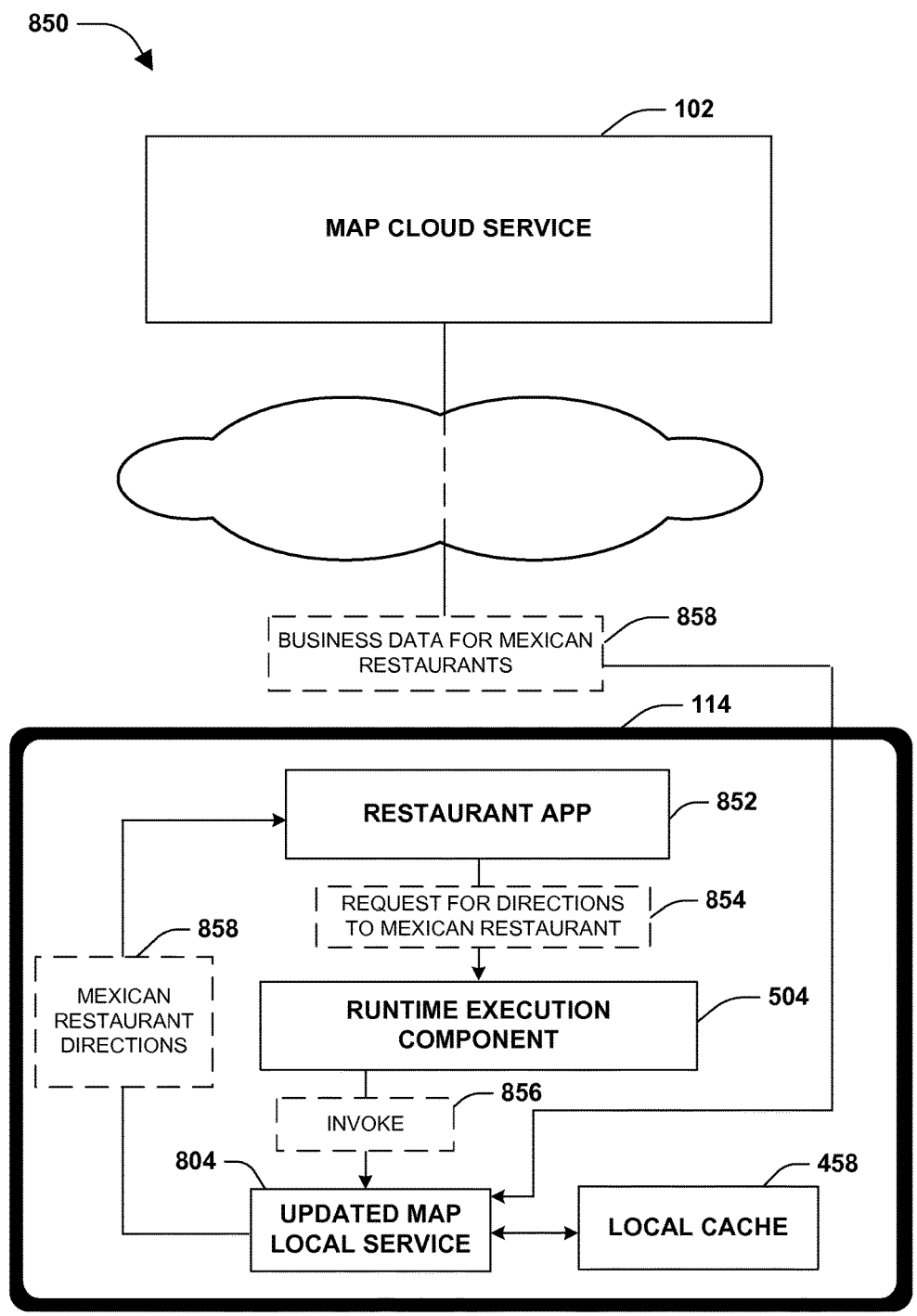
FIG. 8B is a component block diagram illustrating an exemplary system for processing a request from an app utilizing data and/or functionality from a local service and a cloud service.

FIG. 8B illustrates an example of a system 850 for processing a request from an app utilizing data and/or functionality from a local service and a cloud service. In an example, a map local service (e.g., 408 in FIG. 4A) may have been deployed, with a map display functionality code package, on a client device 114 as a local instantiation of a map cloud service 102. The map local service may have been updated with a directions functionality code package (e.g., 802 in FIG. 8A), resulting in an updated map local service 804 (e.g., FIG. 8A). The updated map local service may access a local cache (e.g., 458 in FIG. 4B) to obtain access to a Cleveland map data package (e.g., 454 in FIG. 4B) locally cached therein.

The system 850 may comprise a runtime execution component 504. The runtime execution component 504 may be configured to receive (e.g., intercept) a request from an app on the client device 114 for functionality provided by the map cloud service 102. For example, the runtime execution component 504 may receive a request 854 from a restaurant app 852 for directions to a Mexican restaurant. The runtime execution component 504 may identify the updated map local service 804 as being configured to process the request 854 based upon the updated map local service 804 being updated with the directions functionality code package. Accordingly, the runtime execution component 504 may invoke 856 the updated map local service 804 to process the request 854. In an example, the local cache 458 may not comprise business data for Mexican restaurants. Accordingly, the updated map local service 804 may be provided with access to the map cloud service 102, such as access to a businesses database (e.g., 104 in FIG. 4A) of the map cloud service 102. In this way, the updated map local service 804 may retrieve business data 858 for Mexican restaurants from the map cloud service (e.g., a data fetch component (e.g., 452 in FIG. 4B) may be invoked to retrieve a Mexican restaurant data package from the map cloud service for caching within the local cache 458). The updated map local service 804 may process the request 854, and may provide Mexican restaurant directions 858 to the restaurant app 852. In an example where the updated map local service 804 is missing at least a portion of functionality used to process the request 854 (e.g., restaurant reservation functionality), a functionality retrieval component (e.g., 402 in FIG. 4A) may be configured to invoke the map cloud service 102 to perform such functionality and/or may be configured to retrieve a functionality code package, corresponding to the missing portion, from the map cloud service 102 for utilization by the updated map local service 804. In this way, requests from apps on the client device 114 may be locally processed by local services and/or processed by cloud services.

Figure 9:
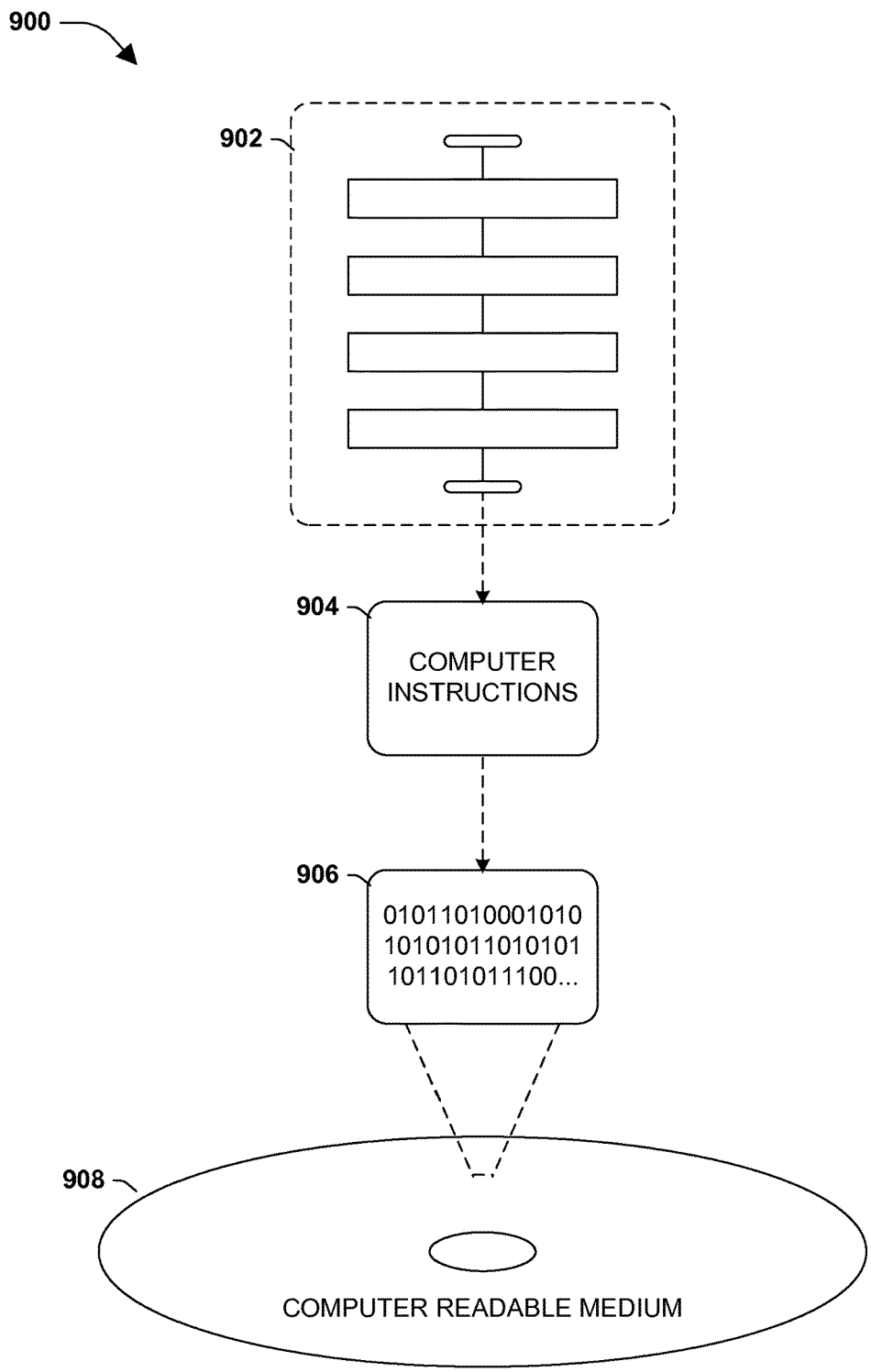
FIG. 9 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 200 of FIG. 2 and/or at least some of the exemplary method 300 of FIG. 3, for example. In some embodiments, the processor-executable instructions 904 are configured to implement a system, such as at least some of the exemplary system 400 of FIG. 4A, at least some of the exemplary system 450 of FIG. 4B, at least some of the exemplary system 500 of FIG. 5, at least some of the exemplary system 600 of FIG. 6A, at least some of the exemplary system 650 of FIG. 6B, at least some of the exemplary system 700 of FIG. 7, at least some of the exemplary system 800 of FIG. 8A, and/or at least some of the exemplary system 850 of FIG. 8B for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
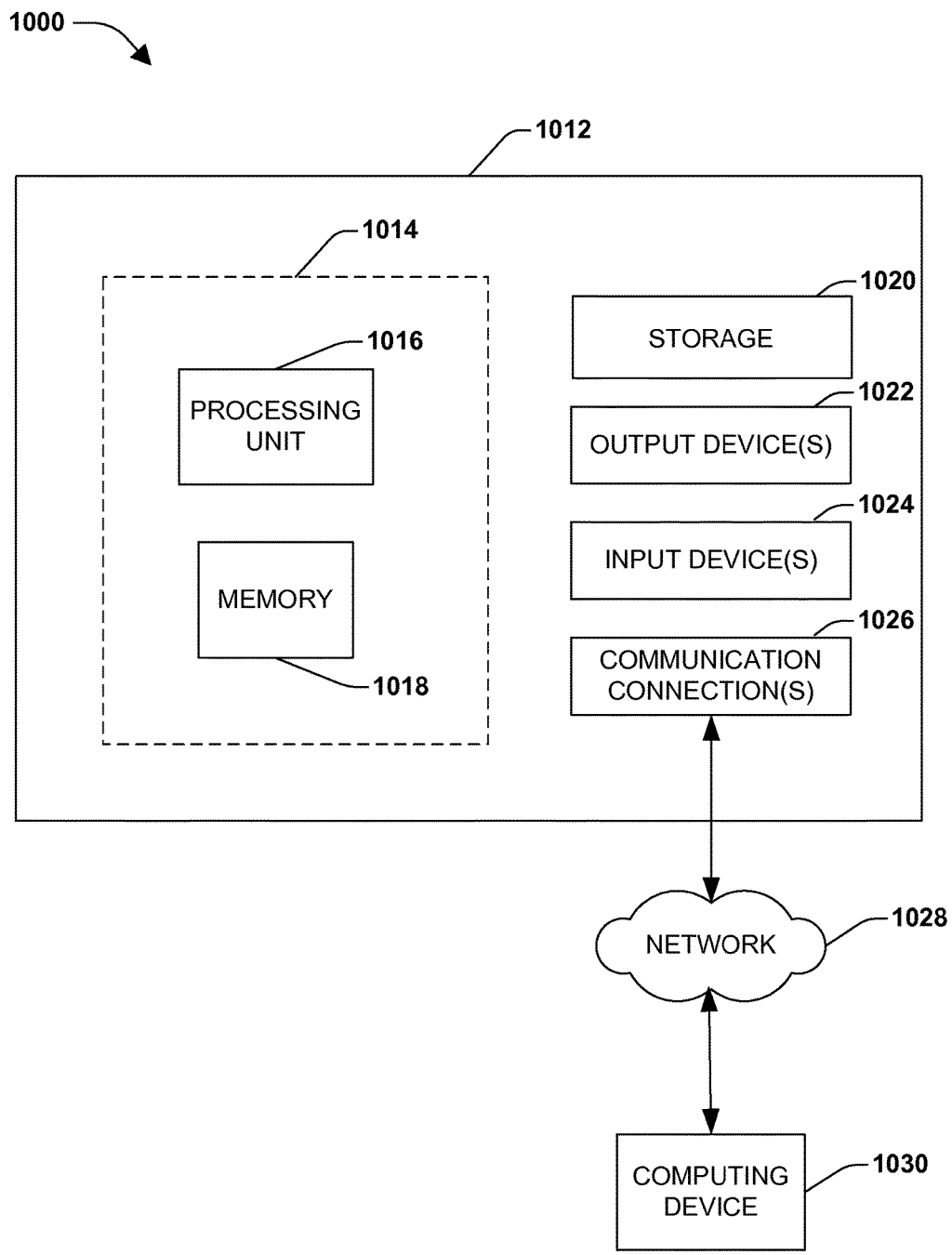
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for cloud service hosting on a client device, comprising
a runtime execution component of the client device configured to:
receive a request from an app that is hosted on the client device to access first functionality of a cloud service that is hosted by a remote cloud computing environment with which the client device communicates;
identify a local instance of the cloud service that is hosted on the client device that is configured to process the request; and
invoke the local instance of the cloud service that is hosted on the client device to process the request from the app that is hosted on the client device, utilizing an instance of the first functionality that has been cached on the client device by the cloud service; and
a data fetch component configured to retrieve a data package from the cloud service, the data package comprising only a subset of data required by the local instance of the cloud service that is hosted on the client device to perform the first functionality, but is not already cached on the client device, the first functionality being performed after the data package is retrieved.

2. The system of claim 1, comprising
a functionality retrieval component configured to:
receive a functionality code package from the cloud service, the functionality code package comprising an instance of second functionality provided by a code module of the cloud service; and
install the functionality code package into the local service for execution of the second functionality by the local service as a local instantiation of the code module of the cloud service.

3. The system of claim 1, wherein the data fetch component is further configured to
store the data package within a local cache for utilization by the local service.

4. The system of claim 1, comprising
a device coupling component configured to register the local service with the client device for access to client device data.

5. The system of claim 4, the client device data comprising at least one of internet connectivity data, power source data, location tracking data, user data, or operating system data.

6. The system of claim 4, comprising
a data fetch component configured to:
maintain a local cache comprising one or more data packages cached from the cloud service for utilization by the local service;

identify a data package on the cloud service as comprising data corresponding to the client device data; and
update the local cache with the data package.

7. The system of claim 1, the runtime execution component configured to:
responsive to determining that the local service is missing at least a portion of the first functionality, invoke a functionality retrieval component to retrieve a functionality code package that corresponds to a missing portion of the first functionality, from the cloud service.

8. The system of claim 1, the runtime execution component configured to:
responsive to determining that the local service does not comprise a data package used to process the request, invoke a data fetch component to retrieve the data package from the cloud service.

9. The system of claim 1, wherein the runtime execution component is configured to facilitate beta testing by selecting a beta test service as the local service based upon a test setting that indicates a portion of the requests that are to be processed by the beta test service.

10. The system of claim 1, the runtime execution component configured to perform a security check on the request to determine whether the app has access credentials to at least one of the cloud service or the local service.

11. The system of claim 1, the request received as an internet protocol request by the runtime execution component.

12. The system of claim 1, the runtime execution component configured to collect analytics associated with the local service processing the request.

13. The system of claim 1, the runtime execution component configured to:
identify a second cloud service configured to provide second functionality corresponding to a context associated with at least one of an operating context of the client device or personalization information for a user of the client device; and
install a second local service on the client device based upon an install package received from the second cloud service, the second local service hosted on the client device as a local instantiation of the second cloud service.

14. The system of claim 1, the runtime execution component configured to provide the local service with access to data hosted by the cloud service.

15. The system of claim 1, the runtime execution component configured to execute the local service as a background service configured to process requests from one or more apps hosted on the client device.

16. The system of claim 1, wherein the subset is also determined based on personalization information of a user of the client device.

17. The system of claim 16, wherein the personalization information is obtained from each of social network information, a user profile, email data, calendar data, microblog messages, and a user photo.

18. The system of claim 1, wherein the subset is also determined based on a location of the client device, which represents an operating context of the client device.

19. A computer readable device comprising instructions that when executed perform a method for cloud service hosting on a client device, the method comprising:
receiving a request from an app that is hosted on the client device to access first functionality of a cloud service that is hosted by a cloud computing environment;
identifying a local instance of the cloud service that is hosted on the client device that is configured to process the request;
invoking the local instance of the cloud service to process the request from the app that is hosted on the client device, utilizing an instance of the first functionality that has been cached on the client device by the cloud service; and
retrieving a data package from the cloud service, the data package comprising a subset of data required by the local instance of the cloud service that is hosted on the client device to perform the first functionality, but is not already cached on the client device, the first functionality being performed after the data package is retrieved.

20. The device of claim 19, wherein the subset is also determined based on personalization information of a user of the client device.

21. A system for minimizing resources of a cloud service, comprising
a runtime execution component of a client device, the component being configured to:
intercept a request from an app that is hosted on the client device, the request being to access first functionality of the cloud service, which is hosted by a remote cloud computing environment with which the client device communicates;
identify a local instance of the cloud service that is hosted on the client device that is configured to process the request; and
invoke the local instance of the cloud service that is hosted on the client device to process the request from the app that is hosted on the client device, utilizing an instance of the first functionality that has been cached on the client device by the cloud service; and
a data fetch component configured to:
identify a data package comprising only a subset of data utilized by the local instance of the cloud service to perform the first functionality, but is not already cached on the client device; and retrieve the data package from the cloud service, wherein the first functionality is performed after the data package is retrieved.

* * * * *